M. BUCH.
TOP FOR VEHICLES AND THE LIKE.
APPLICATION FILED NOV. 15, 1915.
1,204,337.
Patented Nov. 7, 1916.
2 SHEETS—SHEET 1.
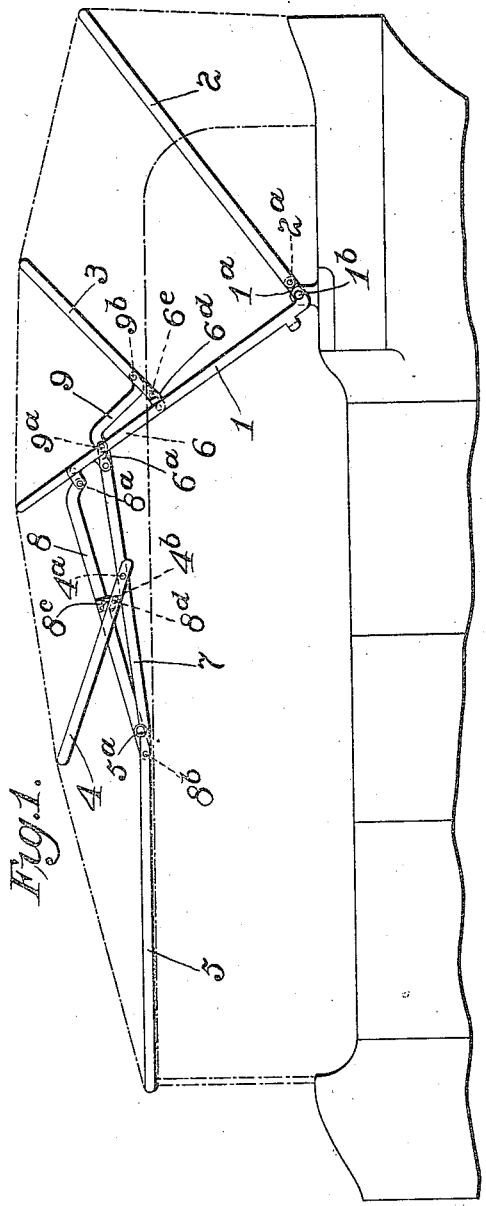
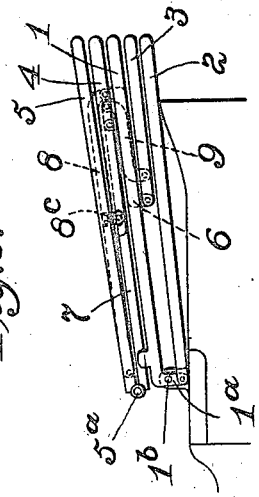
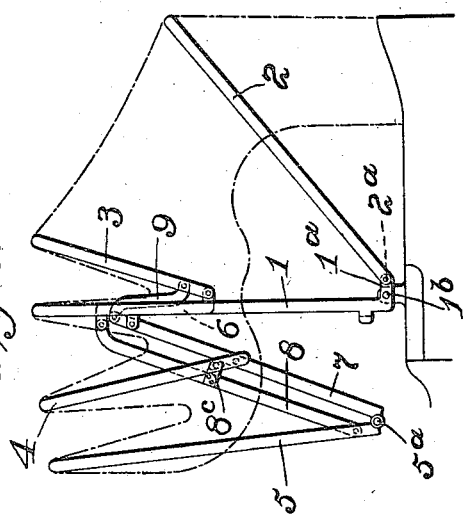
Inventor:
Max Buch,
by Spear Middleton Donaldson & Spear
Atty's.

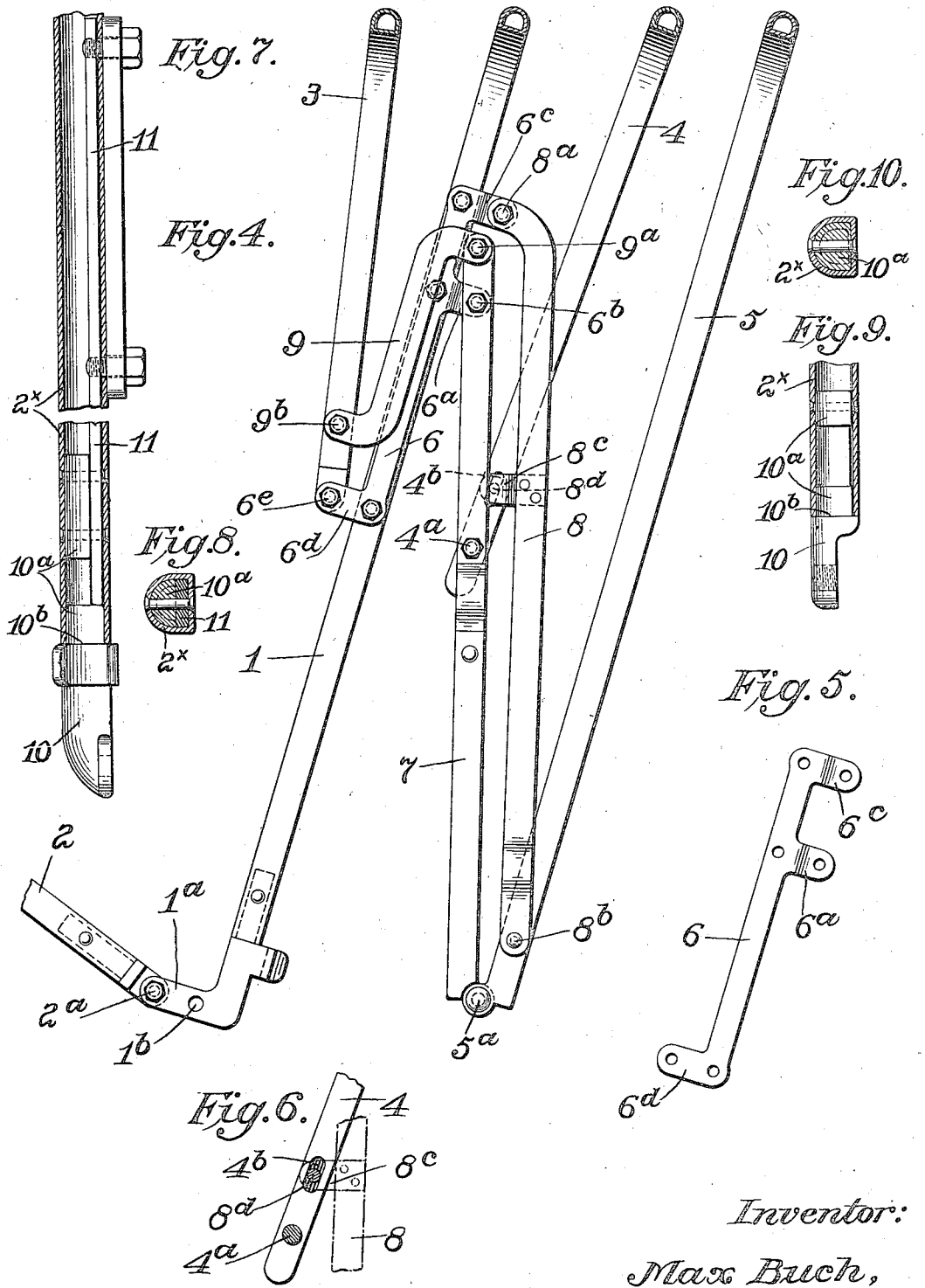

UNITED STATES PATENT OFFICE.

MAX BUCH, OF DETROIT, MICHIGAN, ASSIGNOR TO HENRY E. EDWARDS, OF JACKSON, MICHIGAN.

TOP FOR VEHICLES AND THE LIKE.

1,204,337.  Specification of Letters Patent.  Patented Nov. 7, 1916.

Application filed November 15, 1915. Serial No. 61,611.

*To all whom it may concern:*

Be it known that I, MAX BUCH, a subject of the Emperor of Germany, residing at Detroit, Michigan, have invented certain new and useful Improvements in Tops for Vehicles and the like, of which the following is a specification.

My present invention relates to improvements in tops, hoods or covers designed for use on vehicles of any kind, motor boats and so forth and has for its object to provide an extremely simple and efficient arrangement of the bows and links or levers whereby a uniform movement of the front and intermediate bows will be secured, the top be capable of being extended or collapsed by a single operator and this without disturbing the occupants of the vehicle.

With these and other objects in view the invention includes the novel features of construction, arrangement and combination of parts hereinafter described and particularly defined by the appended claims.

An embodiment of my invention is illustrated in the accompanying drawing, in which, Figure 1 is a view of the cover or top in its extended or unfolded position. Fig. 2 is a view of the same with parts in position assumed approximately midway of the folding or collapsing movement. Fig. 3 is a view of the top completely folded, Fig. 4 is a sectional elevation of the top on a larger scale and showing the same in a partly folded condition, and Figs. 5 to 10 inclusive are views of details of construction.

Referring by reference characters to this drawing 1 designates an arm or standard, which preferably is provided with an angular extension $1^a$, provided with an opening $1^b$, designed to receive the pintle of the usual bracket by which the top is pivotally supported from the vehicle. A rear bow arm 2 has its end pivotally connected to the extremity of the extension $1^a$ as indicated at $2^a$.

The numeral 3 designates the intermediate or auxiliary rear bow arm; the numeral 4 the intermediate or auxiliary front bow arm and the numeral 5 the front or out rigger bow arm, these all being connected to and supported from the main arm or standard 1 in the manner, which will now be described in detail.

It will be understood that the arrangement of the arms of the bows and the connecting links, levers or braces on opposite sides of the top are identical so that a description of one side answers for both.

Referring now to one side, the arm or standard 1 has secured to its inner face a metal bar 6, which has a lateral projection $6^a$ to which is pivotally connected at $6^b$ a lever member 7. This lever member 7 supports at its front end the front or outrigger bow arm 5, which is connected thereto by the pivot or hinge $5^a$, which is preferably of the lock type. The lower end of the arm of the front intermediate bow 4 is pivotally connected to the lever 7 intermediate of the pivots or hinges $5^a$ and $6^b$ by the pivot connections $4^a$. Extending transversely from the upper end of the bar 6 is a second angular lug or extension $6^c$ to which is connected by pivot pins $8^a$ the rear downwardly curved end of a link 8. The forward end of this link 8 is connected to the front or outrigger bow arm 5 at a suitable distance from the pivot pin $5^a$ by the pivot $8^b$. Intermediate of its length this link 8 carries a laterally projecting lug or member $8^c$, which is provided at or near its end with a pin or projection $8^d$ which engages an elongated slot $4^b$ in the inner face of the arm of the front auxiliary bow arm 4, thus providing a sliding connection between the bow arm 4 and the lug or bracket $8^c$ of the link 8. The lower end of the iron 6 is provided with a transversely or angularly extending lug or member $6^d$ which is extended rearwardly of the bow arm 1 or in a direction opposite to that of the lugs $6^a$ and $6^c$ and to this lug $6^d$ the rear auxiliary bow arm 3 is pivotally connected, as indicated at $6^e$. A link 9 having oppositely curved or turned ends affords connection between the rear end of lever member 7 and the bow arm 3, being connected to lever 7 by pivot pin $9^a$ and to bow arm 3 by pivot pin $9^b$.

By reason of the connections thus described the position of the bows when extended is accurately determined while at the same time through the lever member 7 and link 8 and the link 9 acting on levers 7 the bows move forward and backward in the folding and unfolding action in an approximately horizontal path, that is without rising or falling until the extreme rear of the vehicle is reached. Thus the top may be folded or unfolded without disturbing the occupants. Furthermore the top may be easily operated to extend it or to collapse or fold it by a single operator either from within or without the vehicle.

It will be observed that the slot 4[b] extends longitudinally of the arm of bow 4 and hence in the folding and unfolding movement the pin 8[d] has a lengthwise movement therein. This has an important function, as while permitting the folding movement above described, it prevents any oscillations of bow 4 with relation to bows 1 and 5, as will be clearly seen from Fig. 4. This avoids any danger of injury or defacement of the lining or upholstery of the top during the movement of the parts.

Each lever member 7 is preferably made semicircular in cross section from the point of its connection with the front bow rearward until it approaches pivot point 4[a], when it is deflected inwardly and merges into a flat bar for the balance of the distance. This enables the front half of each lever member to form practically a continuation of the front bow when extended and with to lie in the same plane therewith and with the corresponding side of intermediate bar 4.

I have also shown in the present drawing a preferred construction of bow member and socket, which is illustrated in the drawings in Figs. 7 to 10. According to this construction I make the bow member, or at least the side parts or arms thereof, of tubing non-circular in cross section and make the lugs used to connect the bows to the vehicle or to each other with parts of corresponding shape in cross section, which being pressed tightly into the tubing ends will be held therein against rotary movement by the fact that they are non-circular and thus it is only necessary to secure them against pulling out, which may be easily done by rivets or bolts or by a spot welding. Preferably the tubing will be made of D shape or semicircular in cross section as indicated at 2[x]. The lug or bracket member 10 has a portion 10[a] of a similar D shape in cross section which is designed to fit tightly into the tubing ends and the abutting flat faces are adapted to be easily fastened together by rivets, spools or spot welding.

For the arm or standard 1 or other parts where special strength is required, I may reinforce the tubing by a flat steel bar indicated at 11. In this case the flat steel bar would fit and lie against the flat side of the tubing of the bow and the D shaped portion of the attaching lug or bracket would be made of a size to fit in the remaining unfilled portion of the end of the bow arm or standard. The lugs extend upward into the bow high enough to provide a back plate against which the outer or upper brackets would be fastened, thereby providing an additional thickness of metal for securing said upper lugs or brackets in place. The lug or bracket at the end of the bow arm or standard would be provided with a shoulder 10[b] to provide a smooth finish and to easily locate the exact position of the bracket.

I claim as my invention:

1. A vehicle top comprising a pivoted arm or standard, a front bow arm, a member pivoted to the front bow arm and to the standard, a link 8 pivoted to the standard above said member and to the front bow arm in front of the pivot of said member, an intermediate bow arm having its extremity pivoted to said member, and a sliding connection between said intermediate bow arm and said link, said sliding connection operating longitudinally of the intermediate bow arm.

2. A vehicle top comprising a pivoted arm or standard, a front bow arm, a member pivoted to each side of the front bow arm, and to the standard, a link pivoted to each side of the standard above said member and to the front bow in front of the pivot of said member, an intermediate bow arm having its extremity pivoted to said member, said intermediate bow arm having a longitudinal slot and a pin on said link engaging said slot.

3. A vehicle top comprising a standard, a front bow arm, a lever member pivoted to the front bow arm and to the standard and having a part extended beyond its pivoted connection, a link pivoted to the standard above said lever member and to the front bow arm in front of the pivoted connection to said lever member, a front intermediate bow arm having its extremity pivoted to said lever member and having a lengthwise sliding connection with said link, a rear auxiliary bow arm pivoted to said standard, and a link connecting the extension of said lever member with the said auxiliary bow arm.

4. A vehicle top comprising a pivoted arm or standard, a front bow arm, a member pivoted to the front bow arm and to the standard, a link having a curved end pivoted to the standard above said member and to the front bow arm in front of the pivot of said member, an intermediate bow arm having its extremity pivoted to said member, and lugs or brackets extending laterally from said links and having sliding connections with said intermediate bow lengthwise thereof.

5. A vehicle top comprising a pivoted arm or standard, having a pair of forwardly extending lugs one located above the other, a front bow arm, a lever member pivoted to the front bow arm and to the lower lug, and having a part extended beyond its pivoted connection, a link pivoted to the upper lug and to the front bow arm in front of the pivoted connection to said lever member, a front intermediate bow arm having its extremity pivoted to said lever member and having a sliding connection with said link operating in the plane of the intermediate bow arm, a rear auxiliary bow arm pivoted to a lug projecting rearwardly from said standard, and a link connecting the extension of said lever member with the said auxiliary bow arm.

6. A vehicle top comprising a pivoted arm or standard having a pair of forwardly extending lugs one located above the other, a front bow arm, a lever member pivoted to the front bow arm and to the lower lug and having a part extended beyond its pivoted connection, a link pivoted to the upper lug and to the front bow arm in front of the pivoted connection to said lever member, a front intermediate bow arm having its extremity pivoted to said lever member and having a sliding connection with said link operating in the plane of the intermediate bow, a rear auxiliary bow arm pivoted to a lug projecting rearwardly from said standard, and a link having oppositely turned ends pivotally connected respectively to the rear end of said lever member and to said rear auxiliary bow arm.

7. A vehicle top comprising a pivoted arm or standard, a bar secured to the inner face of said standard and having two forwardly projecting lugs at or near its upper end and a rearwardly projecting lug at its lower end, a front bow arm, a lever member pivoted near its rear end to the lower of the forwardly projecting lugs and at its front end to the end of said front bow arm, a link pivoted to said upper lug and to said bow arm at a point spaced from the end, an intermediate bow arm having its end pivoted to said lever member and having a pin and slot connection with said link, the slot being disposed lengthwise of the intermediate bow arm, a rear auxiliary bow arm having its end hinged to said lower lug, and a link connecting the rear end of the lever member with said rear auxiliary bow arm.

8. A vehicle top comprising a pivoted arm or standard, a front bow arm, a member pivoted to the standard having its rear portion deflected inwardly and flattened and its rear end pivoted to the standard, a link pivoted to the standard above said member and to the front bow arm in front of the pivot of said member, an intermediate bow arm having its extremity pivoted to said member, and a connection between said intermediate bow arm and said link allowing relative sliding movement in the plane of the intermediate bow.

9. A vehicle top comprising a pivoted arm or standard, a front bow arm, a member pivoted to the front bow arm, and to the standard, a link pivoted to the standard above said member, an intermediate bow arm having its extremity pivoted to said member, and having its arm provided with a lengthwise slot or guide, and a pin carried by said link and engaging said slot.

In testimony whereof, I affix my signature in presence of two witnesses.

MAX BUCH.

Witnesses:
ETHEL M. WALKER,
EARLE A. EMERY.